(12) United States Patent
Cheng

(10) Patent No.: US 10,514,574 B2
(45) Date of Patent: Dec. 24, 2019

(54) DIRECT TYPE BACKLIGHT MODULE AND LIQUID CRYSTAL DISPLAY

(71) Applicant: WUHAN CHINA STAR OPTOELECTRONICS TECHNOLOGY CO., LTD, Wuhan, Hubei (CN)

(72) Inventor: Yan Cheng, Hubei (CN)

(73) Assignee: WUHAN CHINA STAR OPTOELECTRONICS TECHNOLOGY CO., LTD, Wuhan, Hubei (CN)

( * ) Notice: Subject to any disclaimer, the term of this patent is extended or adjusted under 35 U.S.C. 154(b) by 0 days.

(21) Appl. No.: 15/577,691

(22) PCT Filed: Aug. 3, 2017

(86) PCT No.: PCT/CN2017/095885
§ 371 (c)(1),
(2) Date: Nov. 28, 2017

(87) PCT Pub. No.: WO2019/019216
PCT Pub. Date: Jan. 31, 2019

(65) Prior Publication Data
US 2019/0025647 A1    Jan. 24, 2019

(30) Foreign Application Priority Data
Jul. 24, 2017  (CN) .......................... 2017 1 0607960

(51) Int. Cl.
*G02F 1/1335* (2006.01)
*G02F 1/13357* (2006.01)

(52) U.S. Cl.
CPC .. *G02F 1/133603* (2013.01); *G02F 1/133512* (2013.01); *G02F 1/133606* (2013.01);
(Continued)

(58) Field of Classification Search
CPC ... G02F 1/133603; G02F 2001/133612; G02F 1/133512; G02F 1/133617;
(Continued)

(56) References Cited

U.S. PATENT DOCUMENTS

| 2002/0093810 A1 | 7/2002 | Toyoda et al. |
| 2009/0168035 A1* | 7/2009 | Kim .................... G03F 7/70391 |
| | | 355/53 |

(Continued)

FOREIGN PATENT DOCUMENTS

| CN | 101126485 A | 2/2008 |
| CN | 101236331 A | 8/2008 |

(Continued)

*Primary Examiner* — Jessica M Merlin
(74) *Attorney, Agent, or Firm* — Mintz Levin Cohn Ferris Glovsky and Popeo, P.C.; Jhongwoo Peck (57) ABSTRACT

The present disclosure discloses a direct type backlight module, which includes a back plate and a light source disposed on the back plate, wherein the light source includes a printed circuit board and a plurality of micro-LED chips electrically connected to the printed circuit board, the plurality of micro-LED chips are arranged in a matrix array on the printed circuit board, and a light shielding unit is disposed between any adjacent two micro-LED chips; and the printed circuit board is further connected with a backlight driving chip thereon which drives each of the plurality of micro-LED chips independently. The present disclosure further provides a liquid crystal display which includes the abovementioned direct type backlight module.

16 Claims, 5 Drawing Sheets

(52) U.S. Cl.
CPC ............... *G02F 1/133617* (2013.01); *G02F 2001/133612* (2013.01); *G02F 2001/133614* (2013.01); *G02F 2001/133628* (2013.01); *G02F 2202/36* (2013.01)

(58) Field of Classification Search
CPC ... G02F 2001/133628; G02F 1/133606; G02F 2202/36; G02F 2001/133614
See application file for complete search history.

(56) References Cited

U.S. PATENT DOCUMENTS

| | | | |
|---|---|---|---|
| 2013/0162506 A1* | 6/2013 | Kim | G06F 1/32 345/82 |
| 2014/0368769 A1 | 12/2014 | Lee et al. | |
| 2016/0154170 A1* | 6/2016 | Thompson | G02F 1/133603 362/609 |
| 2017/0068132 A1* | 3/2017 | Li | G02F 1/133603 |
| 2017/0133818 A1* | 5/2017 | Cok | G02B 5/0242 |
| 2018/0180942 A1* | 6/2018 | Peterson | G02F 1/133603 |
| 2018/0252966 A1* | 9/2018 | Kumamoto | G02F 1/13306 |

FOREIGN PATENT DOCUMENTS

| | | | |
|---|---|---|---|
| CN | 101546063 A | | 9/2009 |
| CN | 102011988 A | | 4/2011 |
| CN | 103076649 A | | 5/2013 |
| CN | 103486460 A | | 1/2014 |
| CN | 104048222 A | | 9/2014 |
| CN | 204460105 U | | 7/2015 |
| CN | 106574749 A | | 4/2017 |
| WO | WO2011-025175 | * | 3/2011 |

* cited by examiner

DIRECT TYPE BACKLIGHT MODULE AND LIQUID CRYSTAL DISPLAY

CROSS-REFERENCES TO RELATED APPLICATIONS

This application is a U.S. national phase application, pursuant to 35 U.S.C. § 371, of PCT/CN2017/095885, filed Aug. 3, 2017, designating the United States, which claims priority to Chinese Application No. 201710607960.8, filed Jul. 24, 2017. The entire contents of the aforementioned patent applications are incorporated herein by this reference.

TECHNICAL FIELD

The present disclosure relates to the display technical field, especially relates to a direct type backlight module, and further relates to a liquid crystal display including the direct type backlight module.

BACKGROUND ART

A Liquid Crystal Display (LCD) is a display apparatus with an ultra-thin plane, consisting of a certain number of color or black and white pixels, and disposed in front of a light source or a reflective surface. The liquid crystal display enjoys its popularity and becomes a mainstream of the display due to its low power consumption, high-definition, small in size and light-weight etc. Most of the liquid crystal displays on the market are backlight type liquid crystal displays including a liquid crystal panel and a backlight module which are disposed to face each other, and the backlight module providing a light source to the liquid crystal panel for displaying so that the liquid crystal panel displays an image.

In recently years, as the High-Dynamic Range (HDR) technology is increasingly applied to digital photography, film art, television and other fields. To realize the HDR technology in the liquid crystal display, a special technology requirement is put forward for the liquid crystal display, that is, the liquid crystal display should be capable of realizing a control to partitions. The more partitions of the liquid crystal display have, the better the local dimming effect is, and the higher the dynamic contrast is, the better the picture quality is. The introduce of the local dimming technology on the liquid crystal display may usually need to partition the backlight of the liquid crystal display, a partition includes several light or one light, a main board analyzes brightness of each partition according a brightness algorithm of an image signal in real time, a backlight driving chip is controlled according to the analysis result to drive each partition in the backlight, thereby achieving the purpose of performing real-time brightness adjustment to the backlight, so that a bright region gets brighter, and a dark region gets darker, which can improve the dynamic contrast and realize energy saving.

The backlight module mainly includes a direct type backlight module and a edge type backlight module, the direct type backlight module may have a better local dimming effect since partitions of LEDs can be in one-to-one correspondence to partitions of liquid crystal glass, thus becomes mainstream of the market, especially to a large-sized liquid crystal panel, and as the backlight area is large, a pitch between LEDs is large, thus a backlight crosstalk between respective partitions is small, and the HDR effect is also good. As for a small-sized liquid crystal display, a pitch between LEDs in the backlight is small, thus it is impossible to implement effective multi-partitions, and a crosstalk of light between the partitions is large, thus the HDR effect thereof is poor.

SUMMARY

With a view to the shortcomings of the prior art, the present disclosure provides a direct type backlight module, which can reduce a crosstalk of light between backlight partitions effectively and improve HDR effect.

In order to achieve the above purpose, the present disclosure adopts the following technical solutions:

a direct type backlight module includes a back plate and a light source disposed on the back plate, wherein the light source includes a printed circuit board and a plurality of micro-LED chips electrically connected to the printed circuit board, the plurality of micro-LED chips are arranged in a matrix array on the printed circuit board, and a light shielding unit is disposed between any adjacent two micro-LED chips. The printed circuit board is further connected with a backlight driving chip thereon which drives each of the plurality of micro-LED chips independently.

The micro-LED chip is a micro-LED chip which emits monochromic blue light, and the direct type backlight module further includes a quantum dot thin film layer disposed above the light source and emitting red light and green light under an excitation of the blue light emitted from the micro-LED chip.

There is a gap between the quantum dot thin film layer and the light source, and the gap has a height of 0.3-0.5 mm.

The quantum dot thin film layer has a thickness of 80-100 μm.

The light shielding unit has a height protruding from the printed circuit board which is not less than a height of the micro-LED chip protruding from the printed circuit board.

A material of the light shielding unit is a light-shielding resin or a light-shielding ink.

A pitch between any adjacent two micro-LED chips is 0.15-0.25 mm.

A heat sink plate is disposed on the back plate, and the printed circuit board is disposed on the heat sink plate.

The plurality of micro-LED chips is divided into a plurality of light control regions on the printed circuit board, and each of the plurality of light control regions includes several micro-LED chips.

On another aspect of the present disclosure, there is provided a liquid crystal display, including a liquid crystal panel and a backlight module which are disposed to face each other, and the backlight module providing a light source to the liquid crystal panel for displaying so that the liquid crystal panel displays an image, wherein the backlight module is the aforementioned direct type backlight module.

As for the direct type backlight module provided in the embodiment of the present disclosure, the light source therein includes a plurality of micro-LED chips arranged in a matrix array on the printed circuit board, and a light shielding unit is disposed between any adjacent two micro-LED chips, and the light shielding unit can restrict a light-emitting angle of the micro-LED chip. Thus, in partition driving of the local dimming, light between the partitions may be effectively spaced from each other, which reduces the crosstalk of light between the backlight partitions and improves the HDR effect of the display. The direct type backlight module remarkably improves the DHR effect of the display when being applied to the small-sized liquid crystal display.

DETAILED DESCRIPTION OF EXEMPLARY EMBODIMENTS

In order for the purpose, technical solution and advantages of the present disclosure to be clearer, the embodiments of the present disclosure will be further explained below in conjunction with the drawings. These preferred embodiments are exemplified in the drawings. The embodiments of the present disclosure as shown in the drawings and as described according to the drawings are only exemplified, and the present disclosure is not limited to these embodiments.

Here, it is also worthy to note that, in order to prevent the present disclosure from being obscured due to unnecessary details, the drawings only illustrate the structure and/or processing steps closely related to the solution based on the present disclosure, while other details less related to the present disclosure are omitted.

Figure 1:
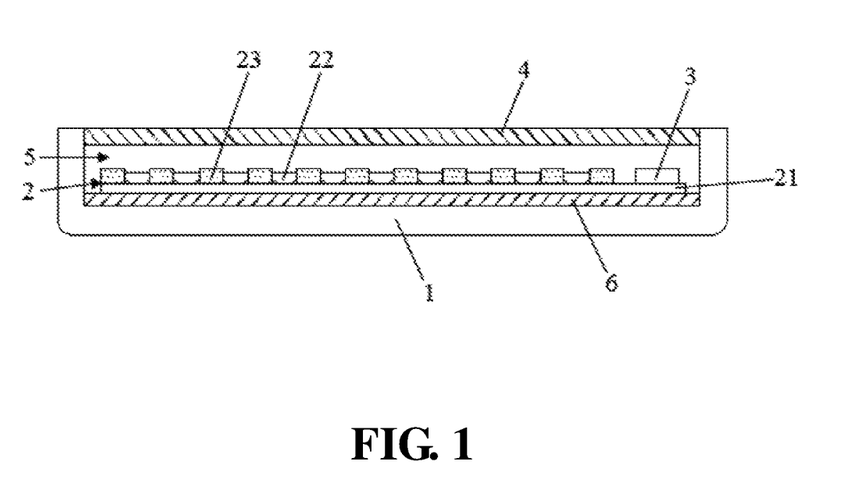
FIG. 1 is a structural diagram of a direct type backlight module provided in an embodiment of the present disclosure.
Figure 2:
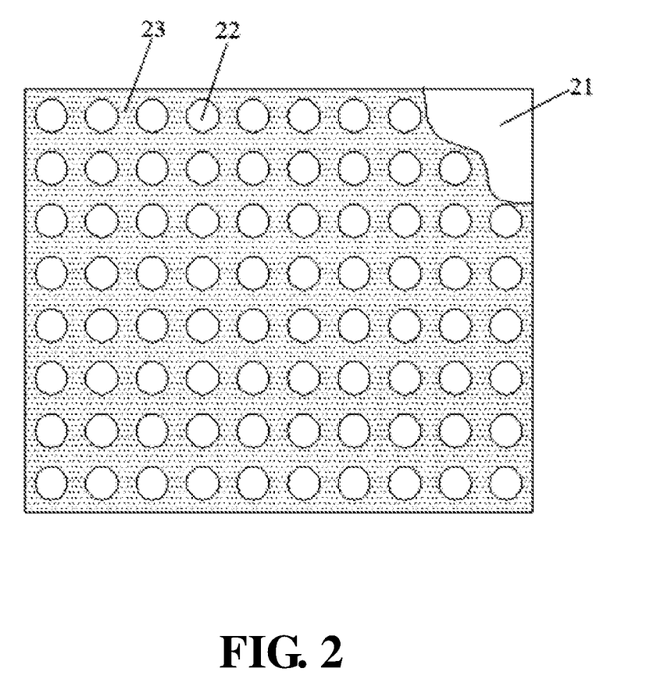
FIG. 2 is a structural diagram of a light source in an embodiment of the present disclosure.

The present embodiment first provides a direct type backlight module. As shown in FIGS. 1 and 2, the direct type backlight module includes a back plate 1 and a light source 2 disposed on the back plate 1. The light source 2 includes a printed circuit board 21 and a plurality of micro-LED (micro light emitting diodes) chips 22 electrically connected to the printed circuit board 21, the plurality of micro-LED chips 22 are arranged in a matrix array on the printed circuit board 21, and a light shielding unit 23 is disposed between any adjacent two micro-LED chips 22. Further, as shown in FIG. 1, the printed circuit board 21 is further connected with a backlight driving chip 3 thereon which drives turning on and turning off of each of the micro-LED chips 22 independently.

In the present embodiment, the micro-LED chip 22 is a micro-LED chip which emits monochromic blue light. As shown in FIG. 1, the direct type backlight module further includes a quantum dot thin film layer 4 disposed above the light source 2 and emitting red light and green light under an excitation of the blue light emitted from the micro-LED chip 22, and the excited red light and green light are mixed with the blue light emitted from the micro-LED chip 22 to form a backlight of white light as a light source for displaying.

Figure 3:
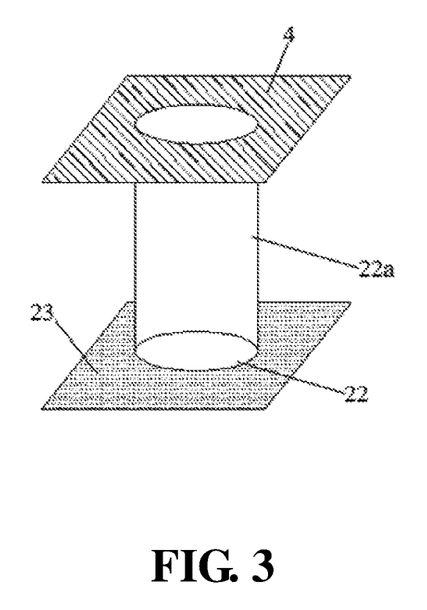
FIG. 3 is an exemplary diagram of light emitted from a micro-LED chip in an embodiment of the present disclosure.

As shown in FIG. 3, the light shielding unit 23 can restrict a light-emitting angle of the micro-LED chip 22 so that beams 22a emitted from the micro-LED chips 22 are nearly collimated beams to be transmitted to the quantum dot thin film layer 4, thus in partition driving of the local dimming, light between the partitions may be effectively spaced from each other, which reduces the crosstalk of light between the backlight partitions.

Specifically, to achieve an effect of well restricting the light-emitting angle, the light shielding unit 23 has a height protruding from the printed circuit board 21 which is not less than a height of the micro-LED chip 22 protruding from the printed circuit board 21, it is preferred that the height of the light shielding layer 23 is slightly greater than that of the micro-LED chip 22.

Specifically, a material of the light shielding unit 23 may be selected to be a light-shielding resin or a light-shielding ink, and the light shielding layer 23 may be formed by a process of screen printing or coated printing. In some specific embodiments, when the backlight module is applied to a small-sized liquid crystal display, a pitch between any adjacent two micro-LED chips 22 is 0.15-0.25 mm, a mask plate is disposed above the micro-LED chips 22 which are arranged in an array, and then through the process of screen printing or coated printing, the light shielding 23 can be formed at a gap part between any adjacent two micro-LED chips 22.

Specifically, referring to FIG. 1, it is preferred that the quantum dot thin film layer has a thickness of 80-100 μm, and there is a gap 5 between the quantum dot thin film layer 4 and the light source 2, the gap 5 has a height which may set to be 0.3-0.5 mm. The quantum dot thin film layer 4 includes a transparent packaging material and quantum dot materials scattered in the packaging material. Quantum dots (QDs), also named as nanocrystals, are nano-particles composed of group II-VI elements or group III-V elements. A particle size of the quantum dots is generally ranged within 1-20 nm. As electrons and holes are quantum-confined, a continuous energy band structure becomes a discrete energy level structure having a molecular characteristic which can emit fluorescent after being excited in a photoluminescence condition, for example, it can emit red light and green light under the excitation of the blue light. Luminescence of the quantum dots has excellent fluorescence intensity and stability, and an emission spectrum of the quantum dots can be controlled by changing a size of the quantum dot.

Further, in the present embodiment, as shown in FIG. 1, a heat sink plate 6 is disposed on the back plate 1, the printed circuit board 21 in the light source 2 is disposed on the heat sink plate 6, and thus it is good to dissipate heat of the micro-LED chip 22 on the printed circuit board 21. In some other embodiments, the direct type backlight module further includes a diffusion sheet disposed above the quantum dot thin film layer 4, for evening out the light emitted from the backlight module.

Figure 4:
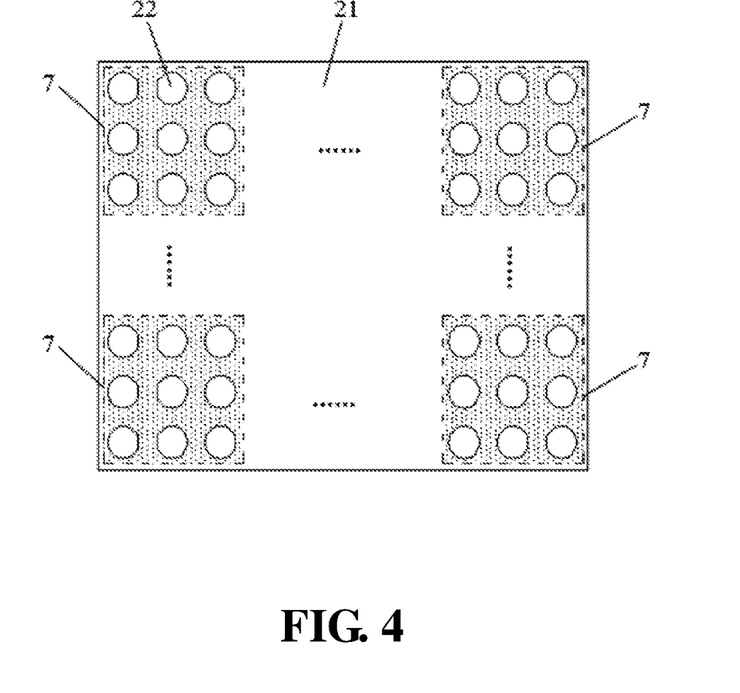
FIG. 4 is an exemplary diagram of partitioning the light source into a plurality of light control regions in some preferred embodiments of the present disclosure.

In present embodiment, as mentioned above, the backlight driving chip 3 can independently drive the turning on and turning off of each of the micro-LED chips 22, and thus in partition driving of the local dimming, it is possible that one micro-LED chip 22 corresponds to one partition. To lower difficulty of driving, in some other embodiments, as shown in FIG. 4, the plurality of micro-LED chips 22 are divided into a plurality of light control regions 7 on the printed circuit board 21, each light control region 7 includes several micro-LED chips 22, and the turning on or turning off and brightness adjustment of all the micro-LED chips 22 in the same light control region 7 are controlled overall by the backlight driving chip 3.

Figure 5:
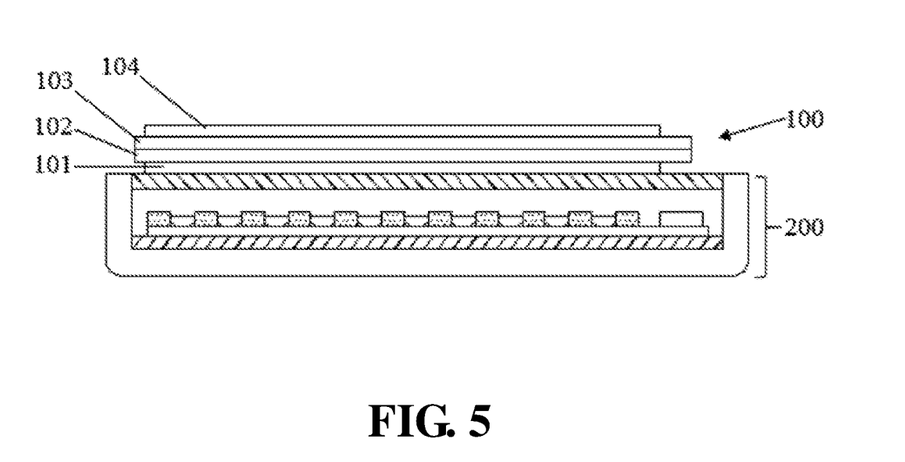
FIG. 5 is a structural diagram of a liquid crystal display provided in an embodiment of the present disclosure.

The present disclosure further provides a liquid crystal display, as shown in FIG. 5, the liquid crystal display includes a liquid crystal panel 100 and a backlight module 200, and the backlight module 200 uses the direct type backlight module provided in the embodiment of the present disclosure. The liquid crystal panel 100 and the backlight module 200 are disposed to face each other, and the backlight module 200 provides a light source to the liquid crystal panel 100 for displaying so that the liquid crystal panel 100 displays an image. The liquid crystal panel 100 includes a low polarizer 101, an array substrate 102, a filter substrate 103 and an upper polarizer 104 disposed sequentially on the backlight module 200, and a liquid crystal layer (not shown in the figures) is disposed between the array substrate 102 and the filter substrate 103.

In conclusion, as for the direct type backlight module provided in the embodiment of the present disclosure, the light source therein includes a plurality of micro-LED chips arranged in a matrix array on the printed circuit board, and a light shielding unit is disposed between any adjacent two micro-LED chips, and the light shielding unit can restrict a light-emitting angle of the micro-LED chip. Thus, in partition driving of the local dimming, light between the partitions may be effectively spaced from each other, which reduces the crosstalk of light between the backlight partitions and improves the HDR effect of the display. The direct type backlight module remarkably improves the DHR effect of the display when being applied to the small-sized liquid crystal display.

It should be explained that the relationship terms, such as first and second, etc., in the present text are only used for distinguishing one entity or operation from another entity or operation without requiring or implying any actual relation or sequence existing between these entities or operations. Moreover, the term "include", "contain" or any other variant means covering instead of exclusively including, so that the process, method, object or device including a series of factors not only includes those factors but also includes other factors that are not explicitly listed or further include inherent factors for this process, method, object or device. Where no more limitations are provided, the factors defined by the sentence "include one . . . " do not exclude additional identical factors existing in the process, method, object or device which includes the factors.

The above statements are only the specific embodiments of the present application, it should be pointed out that, to those ordinary skilled in the art, several improvements and polish can be further made without departing from the principle of the present application, and those improvements and polish should be considered as the protection scope of the present application.

What is claimed is:

1. A direct type backlight module, comprising a back plate and a light source disposed on the back plate, wherein the light source comprises:
    a printed circuit board;
    a plurality of micro-LED chips electrically connected to the printed circuit board, the plurality of micro-LED chips arranged in a matrix array on the printed circuit board; and
    a light shielding unit filling an entire gap between the micro-LED chips and protruding from the printed circuit board with a height greater than a height of the micro-LED chips protruding from the printed circuit board to restrict a light-emitting angle of the micro-LED chips and collimate beams emitted from the micro-LED chips,
    wherein the printed circuit board is further connected with a backlight driving chip thereon which drives each of the plurality of micro-LED chips independently.

2. The direct type backlight module of claim 1, wherein the micro-LED chip is a micro-LED chip which emits monochromic blue light, and the direct type backlight module further comprises a quantum dot thin film layer disposed above the light source and emitting red light and green light under an excitation of the blue light emitted from the micro-LED chip.

3. The direct type backlight module of claim 2, wherein there is a gap between the quantum dot thin film layer and the light source, and the gap has a height of 0.3-0.5 mm.

4. The direct type backlight module of claim 2, wherein the quantum dot thin film layer has a thickness of 80-100 µm.

5. The direct type backlight module of claim 1, wherein a material of the light shielding unit is light-shielding resin or light-shielding ink.

6. The direct type backlight module of claim 1, wherein a pitch between any adjacent two micro-LED chips is 0.15-0.25 mm.

7. The direct type backlight module of claim 1, wherein a heat sink plate is disposed on the back plate, and the printed circuit board is disposed on the heat sink plate.

8. The direct type backlight module of claim 1, wherein the plurality of micro-LED chips are divided into a plurality of light control regions on the printed circuit board, and each of the plurality of light control regions comprises several micro-LED chips.

9. A liquid crystal display, comprising a liquid crystal panel and a backlight module disposed to face each other, the backlight module providing a light source to the liquid crystal panel for displaying so that the liquid crystal panel displays an image, wherein the backlight module is a direct type backlight module comprising a back plate and a light source disposed on the back plate, the light source comprises:
    a printed circuit board;
    a plurality of micro-LED chips electrically connected to the printed circuit board, the plurality of micro-LED chips arranged in a matrix array on the printed circuit board; and
    a light shielding unit filing an entire gap between the micro-LED chips and protruding from the printed circuit board with a height greater than a height of the micro-LED chips protruding from the printed circuit board to restrict a light-emitting angle of the micro-LED chips and collimate beams emitted from the micro-LED chips,
    wherein the printed circuit board is further connected with a backlight driving chip thereon which drives each of the plurality of micro-LED chips independently.

10. The liquid crystal display of claim 9, wherein the micro-LED chip is a micro-LED chip which emits monochromic blue light, and the direct type backlight module further comprises a quantum dot thin film layer disposed above the light source and emitting red light and green light under an excitation of the blue light emitted from the micro-LED chip.

11. The liquid crystal display of claim 10, wherein there is a gap between the quantum dot thin film layer and the light source, and the gap has a height of 0.3-0.5 mm.

12. The liquid crystal display of claim 10, wherein the quantum dot thin film layer has a thickness of 80-100 µm.

13. The liquid crystal display of claim 9, wherein a material of the light shielding unit is light-shielding resin or light-shielding ink.

14. The liquid crystal display of claim 9, wherein a pitch between any adjacent two micro-LED chips is 0.15-0.25 mm.

15. The liquid crystal display of claim 9, wherein a heat sink plate is disposed on the back plate, and the printed circuit board is disposed on the heat sink plate.

16. The liquid crystal display of claim 9, wherein the plurality of micro-LED chips are divided into a plurality of light control regions on the printed circuit board, and each of the plurality of light control regions comprises several micro-LED chips.

* * * * *